United States Patent [19]
Reuter

[11] Patent Number: 4,955,564
[45] Date of Patent: Sep. 11, 1990

[54] MAIN PARACHUTE APPARATUS WITH SECONDARY PARACHUTE FOR AIDING INITIAL INFLATION THEREOF

[75] Inventor: James D. Reuter, Manchester, Conn.

[73] Assignee: Pioneer Aerospace Corporation, South Windsor, Conn.

[21] Appl. No.: 359,599

[22] Filed: Jun. 1, 1989

[51] Int. Cl.[5] ..................... B64D 17/04; B64D 17/18; B64D 17/58; B64D 17/74
[52] U.S. Cl. .................................. 244/149; 244/142; 244/147; 244/150; 244/152
[58] Field of Search ............... 244/142, 149, 113, 147, 244/152, 139, 145, 146, 148, 150

[56] References Cited

U.S. PATENT DOCUMENTS

| | | | |
|---|---|---|---|
| 1,303,976 | 5/1919 | Smith | 244/139 |
| 1,714,753 | 5/1929 | Baker | 244/142 |
| 1,777,934 | 10/1930 | Owens | 244/149 |
| 1,802,325 | 4/1931 | Broadwick | 244/142 |
| 2,308,797 | 1/1943 | Nasca | 244/142 |
| 2,342,384 | 2/1944 | Volf | 244/142 |
| 2,922,605 | 1/1960 | Turati | 244/149 |
| 3,110,459 | 11/1963 | Heinrich | 244/149 |
| 3,278,143 | 10/1966 | Engel, Jr. | 244/150 |
| 3,498,566 | 3/1970 | Vickery | 244/152 |
| 4,117,994 | 10/1978 | Webb | 244/152 |

FOREIGN PATENT DOCUMENTS

| | | | |
|---|---|---|---|
| 600356 | 6/1960 | Canada | 244/147 |
| 179884 | 5/1922 | United Kingdom | 244/149 |
| 334365 | 9/1930 | United Kingdom | 244/149 |
| 381124 | 9/1932 | United Kingdom | 244/149 |

Primary Examiner—Joseph F. Peters, Jr.
Assistant Examiner—James M. Kannofsky
Attorney, Agent, or Firm—Sperry, Zoda & Kane

[57] ABSTRACT

A parachute apparatus with a main canopy having conventional suspension lines and load carrying means with a plurality of main loops attached with respect to the panels of the main canopy. A secondary canopy is positioned within the main inlet opening of the first canopy and is adapted to intially retain the lower edge of the main canopy in a closed position. The outer surface of the secondary canopy and the inner surface of the main loop canopy are connected by way of the main loops and by way of secondary loops located on the external surface of the secondary canopy. A retaining cord extends through the secondary loops and the main loops to reef the main canopy to the secondary canopy during the initial stages of inflation. During this time the secondary canopy will inflate and provide a controlled flow of inflation air into the main chute. Once the main parachute has become partially inflated then the reefing cord is cut allowing full inflation of the larger main canopy.

22 Claims, 4 Drawing Sheets

FIG. 2
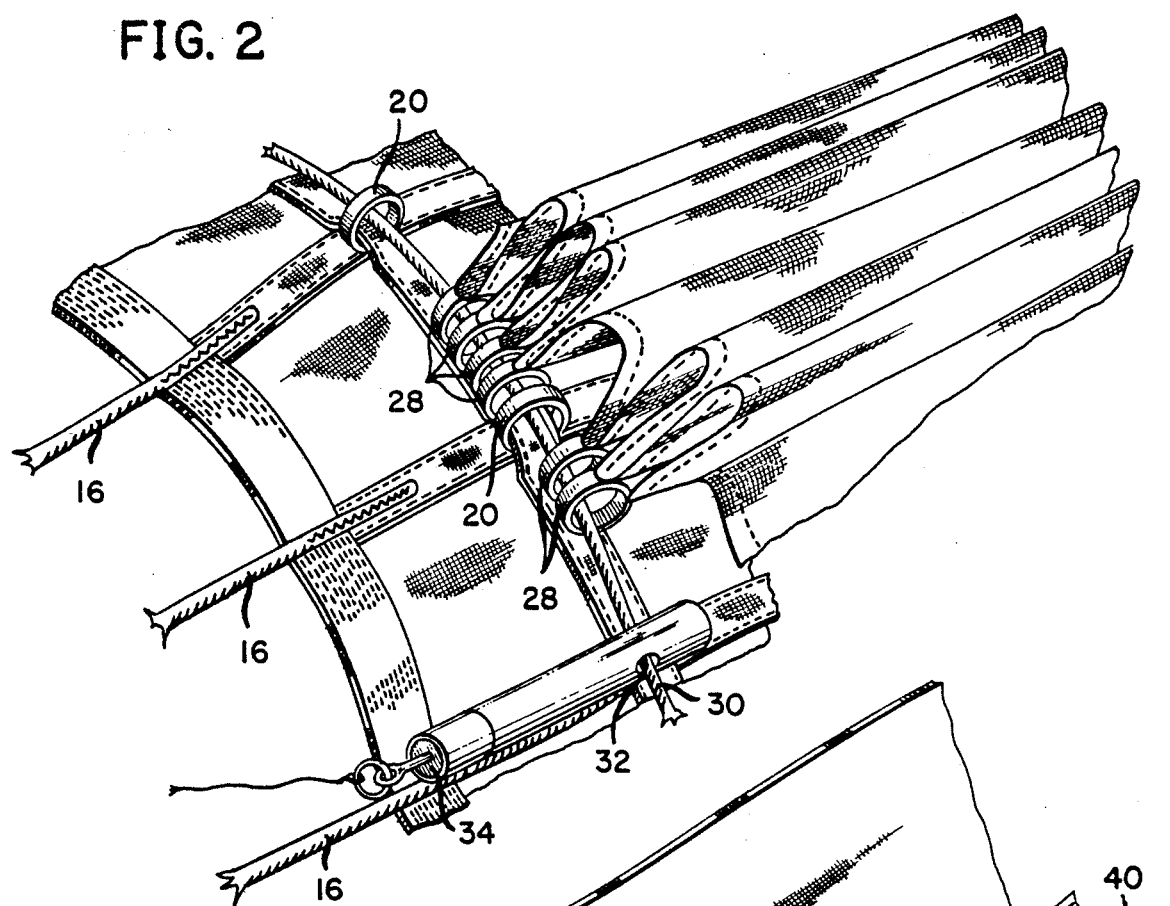
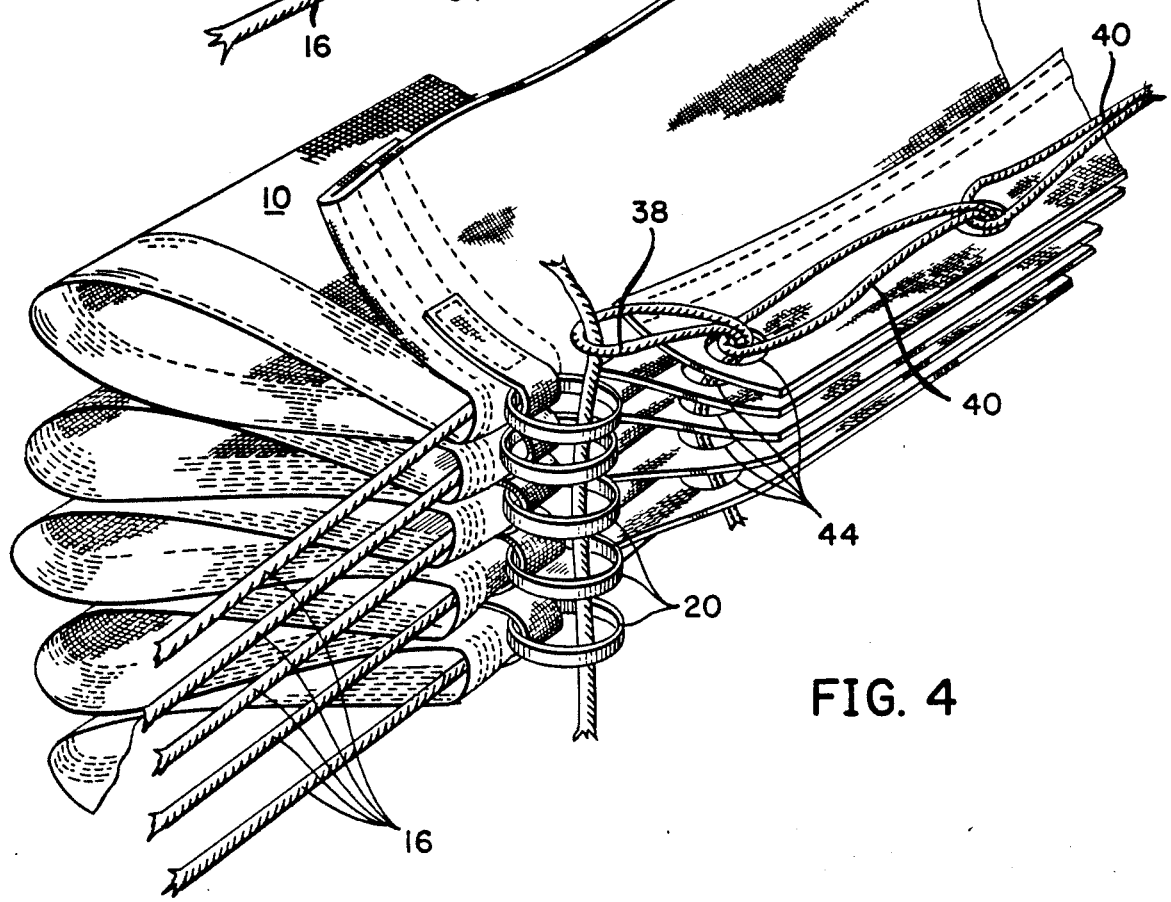
FIG. 4

FIG. 3
FIG. 6
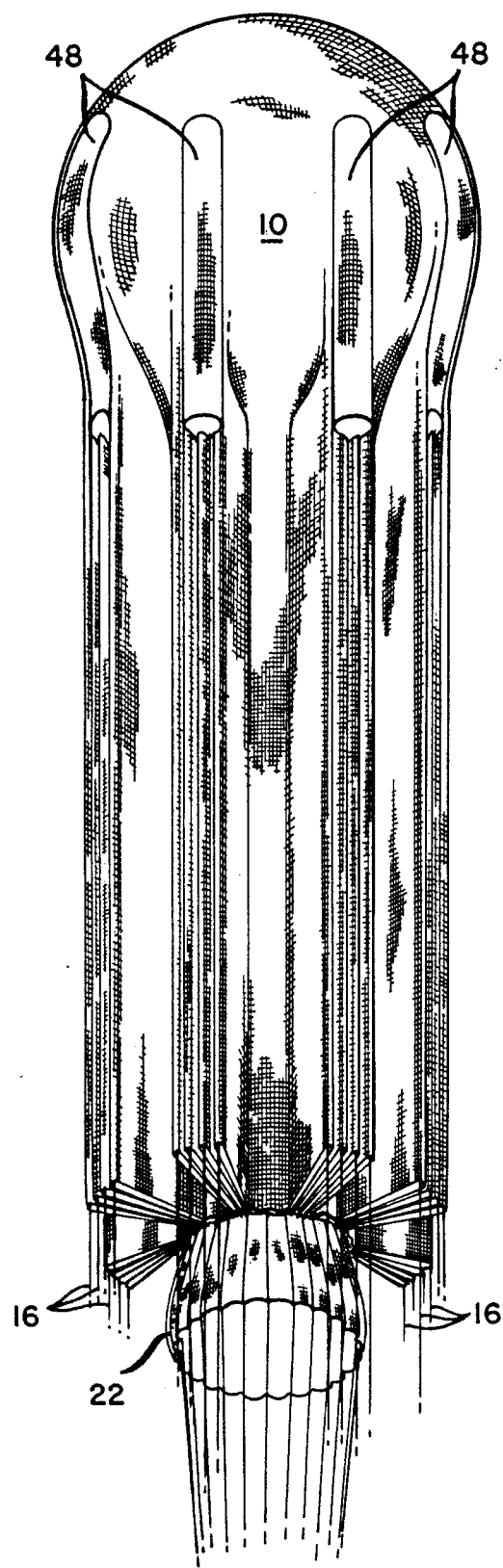
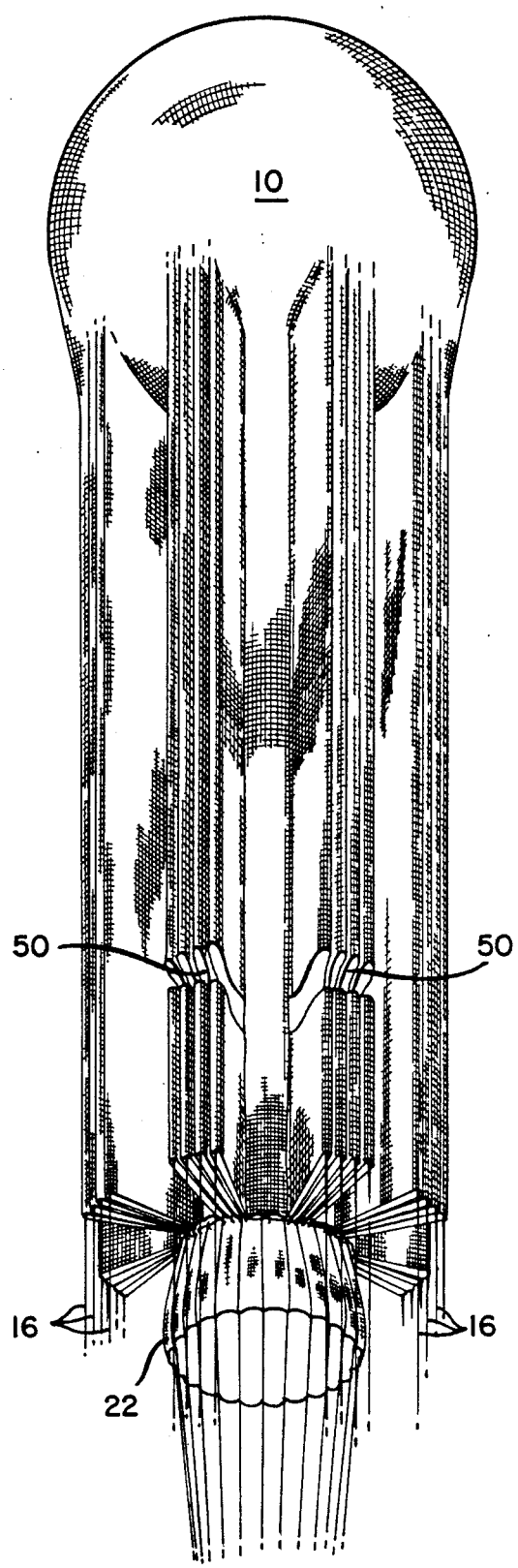

MAIN PARACHUTE APPARATUS WITH SECONDARY PARACHUTE FOR AIDING INITIAL INFLATION THEREOF

BACKGROUND OF THE INVENTION

1. Field of the Invention

The pay loads being delivered by parachute can become particularly large requiring the usage of extremely large parachutes. Currently such large parachutes display undesirable inflation characteristics which limit the size which may be considered for use of such parachutes either as a cluster of several such chutes or as one large parachute. The rate of inflation of such a large parachute is dependent upon the net flow of air flow into the interior. It is difficult to control the shape of the lower edge of the large canopy to maintain a circular shape to facilitate equal symmetry of the parachute during initial stages of inflation. Such chutes tend to form infolded portions and do not operate according to the designed inflation characteristics often resulting in structural failure.

2. Description of the Prior Art

Prior art devices including inflation aids for use in aiding in the initial stages of inflation of large parachutes are of many different designs and configurations. Examples of such structures are shown in U.S. Pat. No. 1,723,122 patented Aug. 6, 1929 to J. Barwicki on a Safety Parachute; U.S. Pat. No. 1,737,913 patented Dec. 3, 1929 to C. Broadwick on a Parachute; U.S. Pat. No. 1,777,934 patented Oct. 7, 1930 to F. Owens on a Parachute; U.S. Pat. No. Re. 18,366 patented Mar. 1, 1932 to F. Owens on a Parachute; U.S. Pat. No. 2,282,234 patented May 5, 1942 to C. Minich on a Parachute; U.S. Pat. No. 2,657,885 patented Nov. 3, 1953 to J. Brady on a Shock Reducing Parachute; U.S. Pat. No. 2,734,706 patented Feb. 14, 1956 to D. Jalbert on a Multicell Parachute Canopy; U.S. Pat. No. 2,764,375 patented Sept. 25, 1956 to P. Lemoigne on a Parachute; U.S. Pat. No. 2,954,191 patented Sept. 27, 1960 to H. Moran on a Controlled Flow Parachute Canopy; U.S. Pat. No. 3,035,798 patented May 22, 1962 to O. Brinkmann on a Parachute; U.S. Pat. No. 3,152,782 patented Oct. 13, 1964 to R. Karpf on a Parachute; U.S. Pat. No. 3,173,636 patented Mar. 16, 1965 to O. Sepp, Jr. on a Parachute; U.S. Pat. No. 3,298,640 patented Jan. 17, 1967 to H. Heinrich on a Parachute; U.S. Pat. No. 3,403,876 patented Oct. 1, 1968 to J. Mitchell on Parachutes; U.S. Pat. No. 3,420,478 patented Jan. 7, 1969 to O. Ferguson on a Parachute; U.S. Pat. No. 3,429,532 patented Feb. 25, 1969 to O. Sepp on a Parachute Skirt Expander; U.S. Pat. No. 3,474,990 patented Oct. 28, 1969 to A. Flatau on a Parachute With Canopy Vent And Standoff Panel; U.S. Pat. No. 3,507,467 patented Apr. 21, 1970 to O. Sepp on a Skirt Expander; U.S. Pat. No. 3,612,449 patented Oct. 12, 1971 to O. Sepp on Boundary Layer Control Parachutes; and U.S. Pat. No. 4,355,774 patented Oct. 26, 1982 to G. Koenig on a Parachute Inflation Assistance Device.

SUMMARY OF THE INVENTION

The present invention provides a main parachute apparatus with a secondary chute for aiding initial inflation and is particularly usable for large main parachutes. The apparatus includes a main canopy having a plurality of vertically extending main panels which define a main inlet opening in the lower portion thereof. A plurality of suspension lines are fixedly secured with respect to the main panels of the main canopy and extend downwardly.

A load carrying means is secured to the lower end of each of the suspension lines which are connected with respect to one another. A plurality of main loops are attached with limited movability with respect to the panels of the main canopy and preferably with respect to the interior of those panels. A secondary canopy is included in this apparatus positioned adjacent the main inlet opening of the main canopy. This secondary canopy includes a secondary inlet opening in the lower portion to facilitate inflation of the secondary canopy. The secondary chute also includes a main inflation opening in the upper portion thereof adapted to supply air from within the secondary canopy to the main canopy to facilitate initial inflation thereof. The amount of air flowing through the main inflation opening controls or limits the movement of air into the interior of the main parachute. In this manner control of the initial stages of inflation of the main canopy is facilitated.

A plurality of secondary loops are attached peripherally with respect to the secondary canopy. A retaining cord extends through the secondary loops and through the main loops to retain them with respect to one another and thus retain the main canopy with respect to the secondary canopy during the initial period of inflation of the main canopy. A retaining cord cutting device is included for selectively releasing of the main loops with respect to the secondary loops to thereby allow full inflation of the main canopy during the final period of inflation.

This cutting means is preferably pyrotechnically actuated and can include a time delay means to control the actual timing of actuation of the pyrotechnic cutting means.

The present invention may further include stay lines extending from the main canopy to the secondary canopy to thereby retain the second canopy in a generally centrally oriented position within the main inlet opening even after full inflation of the main canopy.

A supplementary reefing means may be secured vertically along at least one or more of the main panels of the main canopy to retain the reef panels as a reefed section such as to be collapsed until actuation of the retaining cord cutting means. As such as desired these reefed sections can be positioned symmetrically about the main canopy to facilitate maintaining of the symmetry of the main canopy during the initial stages of controlled inflation thereof.

A secondary reefing means may be adapted to retain the main inflation opening of the secondary canopy closed prior to full inflation of this secondary canopy means. Thereafter the secondary reefing means can be released allowing flow of air through the main inflation opening to initiate inflation of the main canopy.

It is an object of the present invention to provide a main parachute apparatus with secondary parachute for aiding initial inflation thereof being particularly useful for large parachutes wherein total initial capital cost is minimized.

It is an object of the present invention to provide a main parachute apparatus with secondary parachute for aiding initial inflation thereof being particularly useful for large parachutes wherein maintenance is minimized.

It is an object of the present invention to provide a main parachute apparatus with secondary parachute for aiding initial inflation thereof being particularly useful for large parachutes wherein reliability is very high.

It is an object of the present invention to provide a main parachute apparatus with secondary parachute for aiding initial inflation thereof being particularly useful for large parachutes wherein equal loading of the suspension lines is achieved.

It is an object of the present invention to provide a main parachute apparatus with secondary parachute for aiding initial inflation thereof being particularly useful for large parachutes wherein heavy weight loads can be accurately delivered.

It is an object of the present invention to provide a main parachute apparatus with secondary parachute for aiding initial inflation thereof being particularly useful for large parachutes wherein inflation of large parachutes is controlled to thereby be more reliable.

It is an object of the present invention to provide a main parachute apparatus with secondary parachute for aiding initial inflation thereof being particularly useful for large parachutes wherein the rate of air flow into a large parachute in the initial stages of inflation thereof can be accurately and carefully controlled.

It is an object of the present invention to provide a main parachute apparatus with secondary parachute for aiding initial inflation thereof being particularly useful for large parachutes wherein the main inlet opening defined in the lower edge of a main parachute can be controlled to a generally circular shape.

It is an object of the present invention to provide a main parachute apparatus with secondary parachute for aiding initial inflation thereof being particularly useful for large parachutes wherein infolded fabric sections of the main parachute which often occur during inflation are eliminated.

It is an object of the present invention to provide a main parachute apparatus with secondary parachute for aiding initial inflation thereof being particularly useful for large parachutes wherein asymmetrical support of a parachute borne load is eliminated.

It is an object of the present invention to provide a main parachute apparatus with secondary parachute for aiding initial inflation thereof being particularly useful for large parachutes wherein structural failure of seams and fabric is eliminated.

It is an object of the present invention to provide a main parachute apparatus with secondary parachute for aiding initial inflation thereof being particularly useful for large parachutes wherein groupings of similarly configured parachutes all inflate at the same inflation rate.

It is an object of the present invention to provide a main parachute apparatus with secondary parachute for aiding initial inflation thereof being particularly useful for large parachutes wherein severe weight and cost penalties on a parachute recovery system are eliminated.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 2 is a perspective view of the retaining cord and loops shown in the retained position;

FIG. 3 is a full side view of the entire main canopy illustrating an embodiment of the present invention;

FIG. 4 is a perspective view of an embodiment of the main parachute apparatus of the present invention showing the lacing means and supplementary reefing apparatus;

FIG. 6 discloses an embodiment of the main parachute apparatus of the present invention with control openings shown stowed within reefed portions.

DETAILED DESCRIPTION OF THE PREFERRED EMBODIMENTS

Figure 1:
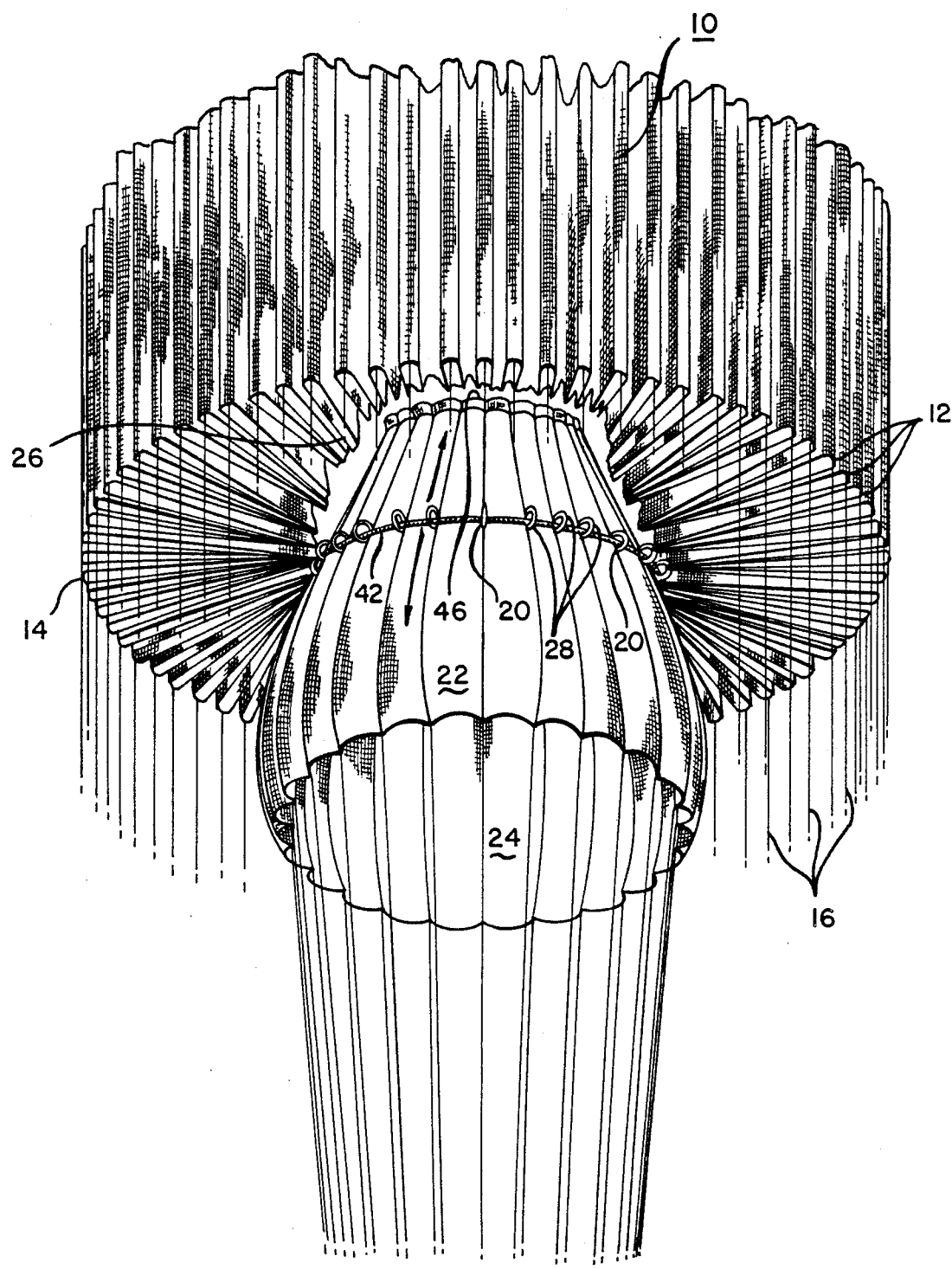
FIG. 1 is a front plan view of an embodiment of the main parachute apparatus of the present invention showing the main canopy retained and the secondary parachute inflated.

The present invention provides a main canopy means 10 which includes a plurality of vertically extending main panels 12 defining a main inlet opening 14 in the lower area thereof. Main inlet opening 14 is adapted to receive inflation air therein during deployment of the main canopy 10 to facilitate full inflation thereof. A plurality of suspension lines 16 preferably made of Kevlar or other material with limited elongation capabilities extend downwardly to a load carrying means 18 therebelow.

A plurality of main loop means 20 are secured with respect to the main canopy 10 and preferably with respect to the lower edge or interior surface thereof. A secondary canopy means 22 is positioned generally adjacent or within the main inlet opening 14 and includes a secondary inlet opening 24 defined therein. A plurality of secondary loops 28 are preferably movably secured with respect to the secondary canopy 22. A retaining cord 30 is adapted to extend through secondary loops 28 and main loops 20 in such a manner that these two loop means are secured with respect to one another during initial stages of inflation.

During the initial stages of inflation air will be prevented from flowing into the main canopy 10 but will flow into the secondary canopy 22.

Secondary canopy 22 defines a main inflation opening 26 in the upper end thereof which is preferably retained in the closed position by secondary reefing means 46 during the initial stages of inflation of the secondary canopy 22. Once the secondary canopy is fully inflated secondary reefing means 46 will be released causing opening of main inflation opening 26. Thus at this point as air flows into the secondary canopy for inflation thereof air will exit from the main inflation opening 26 defined in the upper portion thereof to flow directly into the main canopy means 10 causing some inflation thereof even prior to release of the retaining cord means 30.

Once the main canopy 10 is inflated to a sufficient extent to maintain the overall shape thereof the retaining cord cutting means 32 can cut retaining cord 30 to allow opening of the main inlet opening 14 to allow normal full inflation of main canopy 10. As such at this point the main canopy 10 will maintain the overall general correct shape without having infolded sections and collapsed sections due to the fact that it is already partially inflated prior to opening of the main inlet opening 14 thereof.

The retaining cord cutting means 32 is preferably a pyrotechnic cutting means 34 which can be time delayed actuated set for specific time after deployment of the parachute.

After the main canopy 10 is fully deployed a plurality of stay lines 36 which extend from the secondary canopy 22 to the main canopy 10 become fully extended. Once these are extended they will retain the secondary canopy 22 in a generally centrally located position within the main inlet opening 14 of main canopy means 10 to maintain the overall symmetrical integrity of the parachute apparatus.

To facilitate holding of the main canopy 10 in a collapsed position prior to release of the retaining cord 30 a supplementary reefing means 38 may be included in the form of a lacing means 40 extending through a plurality of eyelets 44 defined in the main panels 12. This lacing means 40 may be connected through the retaining cord 30 as shown best in FIG. 4 to thereby be released simultaneously with actuation of the pyrotechnic cutting means 34. In this manner the main canopy means 10 will be more firmly maintained in the collapsed position due to the sections which are reefed by the supplementary reefing means 38.

Preferably the secondary loop means 28 will be attached to the secondary canopy 22 in the generally positioned vertically mid point 42 thereof. In this manner at least half of the material of the secondary canopy 22 will extend below the lower edge of the main canopy 10 to thereby facilitate inflation of the secondary canopy 22 during the initial stages of inflation thereof.

To further facilitate maintaining of the overall shape of the main canopy 10 during the initial stages of inflation a plurality of fabric scoop means 48 may be positioned about the outer upper surface thereof. These scoops are adapted merely to hold the upper portions of the canopy 10 in a laterally extended position to facilitate symmetry during inflation thereof. These scoops become inoperative once the main canopy means 10 is fully inflated.

Figure 7:
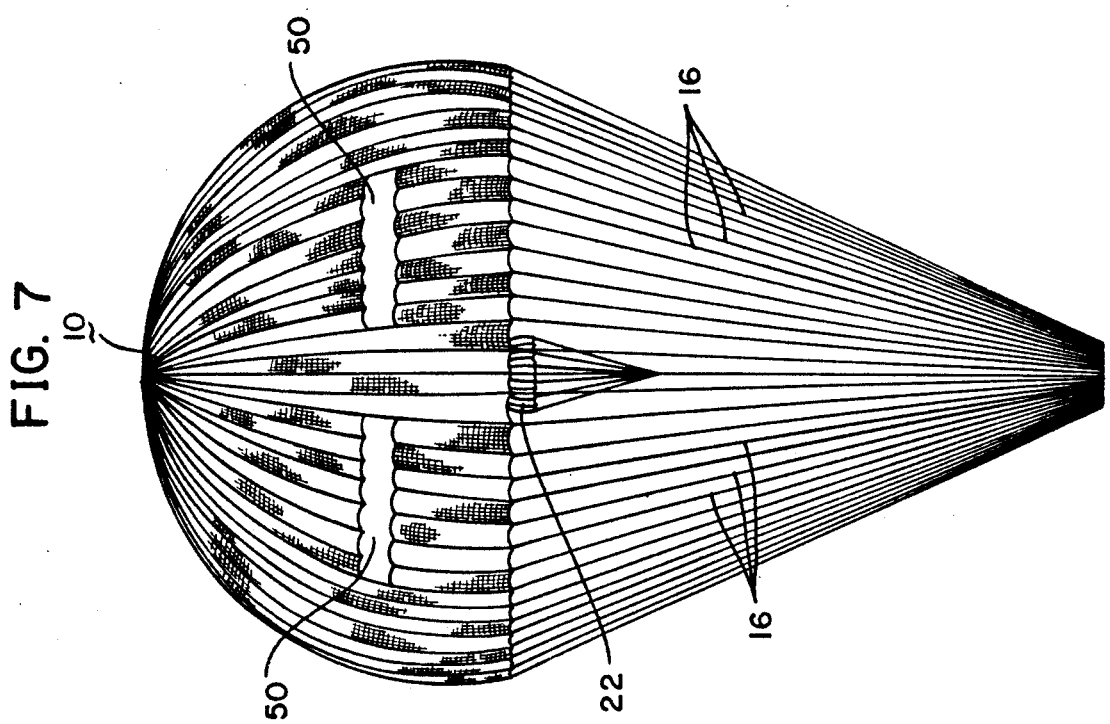
FIG. 7 is an illustration of the embodiment shown in FIG. 6 showing the main parachute apparatus in the fully deployed position.
Figure 5:
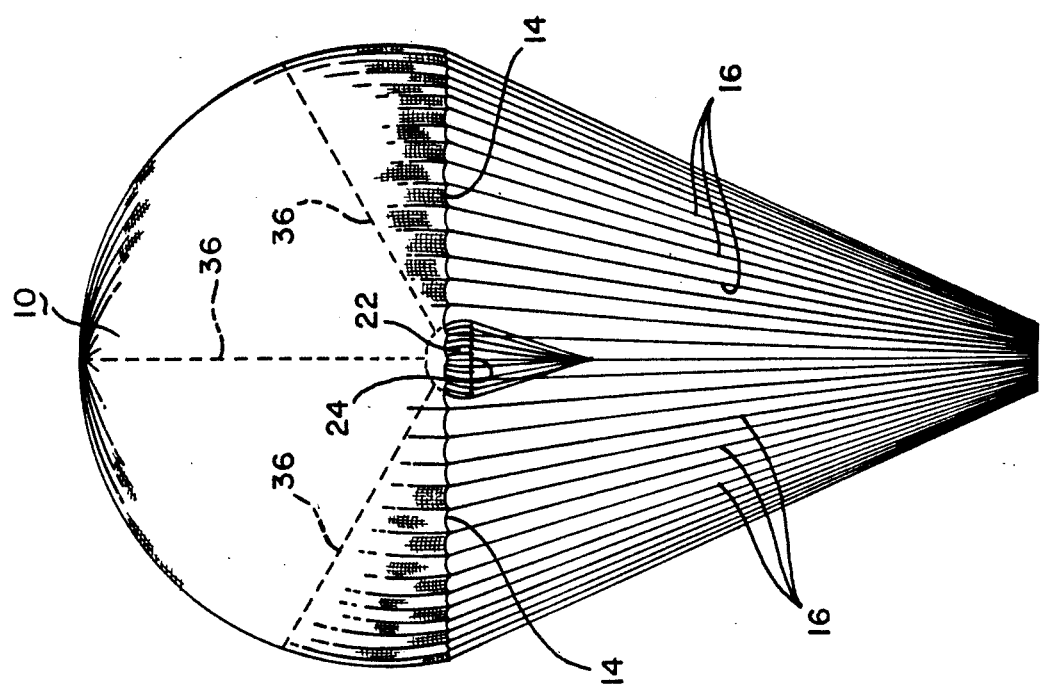
FIG. 5 is a front plan view of an embodiment of the main parachute apparatus of the present invention showing the main canopy and the secondary canopy both inflated fully with stay lines centering the inlet parachute.

The main parachute apparatus of the present invention utilizing a secondary parachute for aiding initial inflation is particularly usable with very large parachutes wherein stability during the activity of inflation is difficult to control. Such large parachutes also have some difficulty in control even after inflation due to lack of steerability and relatively large rates of descent. FIG. 7 illustrates a plurality of control openings 50 which can be usable after full inflation of a large main parachute canopy to directionally control movement thereof. In many applications of such large parachutes it is desirable that they be made to glide forward while descending which is made possible by control openings 50. In this manner a degree of steerability will be imparted to the large parachute design. Also gliding parachutes tend to descend somewhat more slowly than do equivalently sized conventional parachutes. The openings can be cutouts or localized vents being relatively porous with respect to the surrounding fabric of the main canopy. It is preferable that the control openings 50 will be stowed within the reefed portions of the main canopy as shown in FIG. 6 during inflation of the secondary canopy means 22. By stowing of these control openings 50 as shown in FIG. 6 the large parachute becomes essentially a symmetrical form during the very critical initial stages of inflation when maintenance of stability is of maximum importance.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A main parachute apparatus with secondary parachute for aiding initial inflation thereof being particularly useful for large parachutes comprising:
    (a) a main canopy means including a plurality of vertically extending main panels, said main canopy means defining a main inlet opening in the lower portion thereof;
    (b) a plurality of suspension lines fixedly secured with respect to said main panels of said main canopy means and extending downwardly therefrom;
    (c) load carrying means secured to the lower portion of each of said suspension lines to retain a load as desired;
    (d) a plurality of main loop means attached with respect to said panels of said main canopy means;
    (e) a secondary canopy means positioned adjacent said main inlet opening of said main canopy means, said secondary canopy means including a secondary inlet opening in the lower portion thereof to facilitate inflation of said secondary canopy means and including a main inflation opening in the upper portion thereof adapted to supply air from within said secondary canopy to said main canopy means to facilitate initial inflation thereof;
    (f) a plurality of secondary loop means attached peripherally with respect to said secondary canopy means;
    (g) a retaining cord extending through said secondary loop means and said main loop means to retain said main canopy means attached with respect to said secondary canopy means during the initial period of inflation of said main canopy means; and
    (h) a retaining cord cutting means for releasing of said main loop means with respect to said secondary loop means to allow full inflation of said main canopy means during the final period of inflation thereof.

2. A main parachute apparatus with secondary parachute for aiding initial inflation thereof being particularly useful for large parachutes as defined in claim 1 wherein said retaining cord cutting means is pyrotechnically actuated.

3. A main parachute apparatus with secondary parachute for aiding initial inflation thereof being particularly useful for large parachutes as defined in claim 1 further including stay lines extending between said main canopy means and said secondary canopy means to retain said secondary canopy means in position adjacent said main inlet opening after full inflation of said main canopy means.

4. A main parachute apparatus with secondary parachute for aiding initial inflation thereof being particularly useful for large parachutes as defined in claim 1 further including supplementary reefing means secured vertically along at least one of said main panels of said main canopy means to retain the reefed panels collapsed until actuation of said retaining cord cutting means.

5. A main parachute apparatus with secondary parachute for aiding initial inflation thereof being particularly useful for large parachutes as defined in claim 4 wherein said reefed panels are grouped into reefed main sections spaced equally and symmetrically about said main canopy means.

6. A main parachute apparatus with secondary parachute for aiding initial inflation thereof being particularly useful for large parachutes as defined in claim 4 wherein said supplementary reefing means is attached with respect to said retaining cord to be operative to be released responsive to actuation of said retaining cord cutting means.

7. A main parachute apparatus with secondary parachute for aiding initial inflation thereof being particularly useful for large parachutes as defined in claim 1 wherein said secondary canopy means is positioned within said main inlet opening.

8. A main parachute apparatus with secondary parachute for aiding initial inflation thereof being particularly useful for large parachutes as defined in claim 1 wherein said main loop means are movably secured with respect to said retaining cord.

9. A main parachute apparatus with secondary parachute for aiding initial inflation thereof being particularly useful for large parachutes as defined in claim 1 wherein said secondary loop means are movably secured with respect to said retaining cord.

10. A main parachute apparatus with secondary parachute for aiding initial inflation thereof being particularly useful for large parachutes as defined in claim 1 wherein said main loop means are secured to the center areas of said main panels to facilitate retaining thereof during the initial period of inflation of said main canopy means.

11. A main parachute apparatus with secondary parachute for aiding initial inflation thereof being particularly useful for large parachutes as defined in claim 1 wherein said secondary loop means are attached with respect to said secondary canopy means at the approximate vertical midpoint of said secondary panels.

12. A main parachute apparatus with secondary parachute for aiding initial inflation thereof being particularly useful for large parachutes as defined in claim 1 wherein said secondary canopy means maintains said main inlet opening in a generally circular shape prior to release of said retaining cord.

13. A main parachute apparatus with secondary parachute for aiding initial inflation thereof being particularly useful for large parachutes as defined in claim 1 wherein said suspension lines are made of kevlar.

14. A main parachute apparatus with secondary parachute for aiding initial inflation thereof being particularly useful for large parachutes as defined in claim 1 wherein said retaining cord maintains said main panels and said suspension lines symmetrically distributed about said secondary canopy means.

15. A main parachute apparatus with secondary parachute for aiding initial inflation thereof being particularly useful for large parachutes as defined in claim 1 wherein said retaining cord cutting means is operated by time delay after initial deployment.

16. A main parachute apparatus with secondary parachute for aiding initial inflation thereof being particularly useful for large parachutes as defined in claim 4 wherein said main panels define eyelets extending therethrough and wherein said supplementary reefing means includes lacing means extending through said eyelets and about said retaining cord to facilitate retaining of said main canopy means prior to release of said retaining cord cutting means and to facilitate release of said supplementary reefing means after actuation thereof.

17. A main parachute apparatus with secondary parachute for aiding initial inflation thereof being particularly useful for large parachutes as defined in claim 1 further including secondary reefing means adapted to retain said main inflation opening of said secondary canopy means closed prior to full inflation of said secondary canopy means.

18. A main parachute apparatus with secondary parachute for aiding initial inflation thereof being particularly useful for large parachutes as defined in claim 1 further comprising scoop means positioned on the outer surface of said main canopy means to facilitate inflation thereof.

19. A main parachute apparatus with secondary parachute for aiding initial inflation thereof being particularly useful for large parachutes as defined in claim 18 wherein said scoop means is made of fabric material.

20. A main parachute apparatus with secondary parachute for aiding initial inflation thereof being particularly useful for large parachutes as defined in claim 1 wherein said main canopy means defines at least one control opening therein to facilitate control of descent of a fully inflated main parachute apparatus.

21. A main parachute apparatus with secondary parachute for aiding initial inflation thereof being particularly useful for large parachutes as defined in claim 20 wherein said control openings are reefed to a closed position prior to actuation of said retaining cord cutting means.

22. A main parachute apparatus with secondary parachute for aiding initial inflation thereof being particularly useful for large parachutes comprising:
  (a) a main canopy means including a plurality of vertically extending main panels, said main canopy means defining a main inlet opening in the lower portion thereof;
  (b) a plurality of suspension lines of kevlar material fixedly secured with respect to said main panels of said main canopy means and extending downwardly therefrom;
  (c) load carrying means secured to the lower portion of each of said suspension lines to retain a load as desired;
  (d) a plurality of main loop means attached with respect to said panels of said main canopy means;
  (e) a secondary canopy means positioned within said main inlet opening of said main canopy means, said secondary canopy means including a secondary inlet opening in the lower portion thereof to facilitate inflation of said secondary canopy means and including a main inflation opening in the upper portion thereof adapted to supply air from within said secondary canopy to said main canopy means to facilitate initial inflation thereof;
  (f) a plurality of secondary loop means attached peripherally with respect to said secondary canopy means at the approximate vertical midpoint of said secondary panels;
  (g) a retaining cord extending through said secondary loop means and said main loop means to be movable with respect thereto and to retain said main canopy means attached with respect to said secondary canopy means during the initial period of inflation of said main canopy means, said retaining cord maintaining said main inlet opening in a generally circular shape to facilitate full inflation thereof, said retaining cord maintaining said main panels and said suspension lines symmetrically distributed about said secondary canopy means;

(h) a retaining cord pyrotechnic cutting means for releasing of said main loop means with respect to said secondary loop means to allow full inflation of said main canopy means during the final period of inflation thereof;

(i) time delay actuation means for controlling activation of said pyrotechnic cutting means;

(j) stay lines extending between said main canopy means and said secondary canopy means to retain said secondary canopy means in position after full inflation of said main canopy means;

(k) supplementary reefing means secured vertically along at least some of said main panels of said main canopy means to retain sections of reefed panels collapsed until actuation of said retaining cord pyrotechnic cutting means, said reefed panel sections being equally and symmetrically spaced about said main canopy means, said main panels defining eyelets extending therethrough, said supplementary reefing means further including lacing means extending through said eyelets and about said retaining cord to facilitate retaining of said main canopy means prior to release of said retaining cord cutting means and to facilitate release of said supplementary reefing means after actuation thereof;

(l) secondary reefing means adapted to retain said main inflation opening of said secondary canopy means closed prior to full inflation of said secondary canopy means; and (m) fabric scoop means positioned on the outer surface of said main canopy means to facilitate inflation thereof.

* * * * *